May 16, 1967  K. SCHLICHTING  3,319,284
APPARATUS FOR DECAPITATING AND FEEDING
FISHES INTO DRESSING MACHINES
Filed March 18, 1965
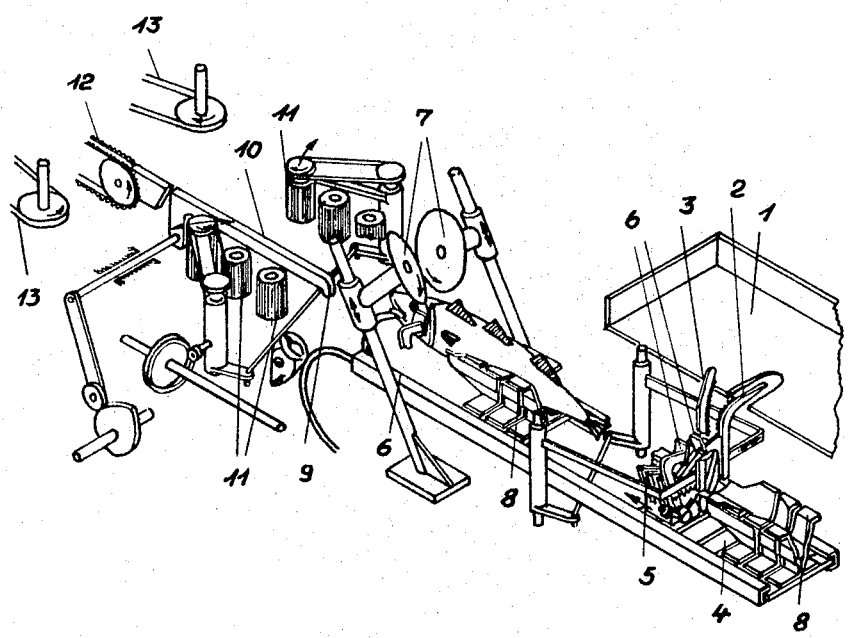
INVENTOR:
K. Schlichting
BY
Richards & Geier
ATTORNEYS

# United States Patent Office 3,319,284
Patented May 16, 1967

3,319,284
APPARATUS FOR DECAPITATING AND FEEDING FISHES INTO DRESSING MACHINES
Karl Schlichting, Lubeck, Germany, assignor to Nordischer Maschinenbau Rud. Baader, Lubeck, Germany, a firm
Filed Mar. 18, 1965, Ser. No. 440,735
Claims priority, application Germany, Mar. 19, 1964, N 24,653
2 Claims. (Cl. 17—4)

The invention relates to an apparatus for decapitating and feeding fishes into dressing machines and has for its object to obtain an uninterrupted flow of fishes from the decapitating process to the machines for preparing or dressing the fishes, thereby increasing the output on the one hand and saving labour on the other hand.

It is known when preparing or dressing fishes to decapitate them resting on their side and, after the decapitation, to allow them to drop at the end of the decapitating belt in such a manner that they are fed into the dressing machine resting on their bellies. This method is satisfactory in the case of herrings and red mullet because these fishes come into the decapitating device unslaughtered and their cross-section is slim elliptical. Attempts to decapitate fish of round cross-section, such as mackerel, cod and sea-salmon, resting on their side and to feed them directly into the dressing machine by pushing them at the tail end, could not in the long run be successful because the round cross-section of these fishes makes it difficult to obtain a sufficiently accurate head cut. Therefore decapitating methods have been used for these fishes which ensure a symmetrical position of the fish. The fishes are thereby fed into the dressing machine by hand.

On board factory trawlers and factory fishing vessels the continuous flow of work is destroyed and consequently additional hands are required for feeding the fishes into the dressing machine. As a result not only the output is impaired but difficulties arise in making available the necessary extra hands.

The object of the invention is to overcome these objections. This is attained in that the fishes, after being placed or introduced into the conveying device moving along a straight path, are gripped by the head, carried along head foremost, decapitated and fed into the dressing machine. Thus a continuous flow of fishes is achieved during the decapitation and dressing without any manual work being necessary except for introducing the fishes into the whole apparatus. This straight working operation, also during the decapitation, is moreover particularly important because in most dressing machines the fishes are processed in stretched or flat operation.

The conveying device can operate continuously, which presents the advantage that the fishes can be fed into the process just as they arrive. As, however, the introduction into the decapitating devices is in any case effected by hand, especially on board a fishing vessel, the conveyance of the fish during the decapitation and feeding into the dressing machine preferably takes place intermittently, whereas in the dressing machine, depending upon the type, the conveyance can take place either continuously or intermittently.

The intermittent conveyance presents the advantage that the intervals of rest can be utilized for introducing the fish into the conveying device, decapitating and positioning the fish ready for feeding into the dressing machine, that is for the procedures for carrying out which the standing-still of the conveying device is particularly advantageous, whereas the periods of movement can then be utilized for carrying the fishes from the point of introduction to the decapitating point, from the decapitating point to the point of feed and pushing the fish from the point of feed into the dressing machine. At the same time the leading off of the severed head can preferably take place during the period in which the fishes are being carried from the decapitating point to the point where they are fed into the dressing machine.

The apparatus for carrying out the method is very simple and consequently economical, besides not being very susceptible to trouble, because it comprises substantially a conveying device provided with head clamps over which a positioning device, a vertically reciprocating decapitating device and a feeding device are provided. At the same time the conveying device can preferably be constructed up to the feeding point in the form of an endless belt running over reversing elements and beyond the feeding point as a roller conveying device with toothed rollers between which the fishes are gripped. The portion of the conveying device constructed as an endless belt can advantageously be provided with V-shaped entrainment elements mounted directly behind the head clamps in the direction of travel. These V-shaped entrainment elements guarantee a perfect belly-back position of the fish, particularly in the case of fish with round or circular cross-section.

A device for carrying out the method according to the invention with intermittently moved conveying device is illustrated diagrammatically by way of example in the only figure of the accompanying drawing, whereby all details are omitted which are known per se and are not necessary for understanding the invention.

The intermittently moved conveying device 4 is provided with entrainment elements arranged at uniform distances apart and comprising supports 5 for the head and V-shaped supports 8 for the body of the fish, between which synchronously controlled head clamps 6 are arranged. The conveying device 4 is constructed as an endless belt extending up to the feeding point whence it consists of a synchronously controlled system of toothed rollers 11.

The introduction point comprises a storage trough 1, a horizontally bent gill guide 2 and a second gill guide 3. The decapitating device consisting of two knives 7 standing at an angle to each other is arranged above the conveyor 4 at a distance from the introduction point.

The feeding device 9 consists of a stylus or prong which serves for supporting the fish, serving as a spreading element. An entrainment belt 12 engages the belly side of the fish and parallel side belts 13 carry the fish through the dressing machine.

The apparatus operates in the following manner:

The fishes are taken by hand from the storage trough 1 and the belly of each fish is pushed over the horizontally bent end of the gill guide 2 until it bears against the gill guide 3. This is effected in such a manner that the collarbone is located behind the synchronized gill guides 2, 3. When the intermittent conveyor 4 next comes to a standstill the fish is pushed downwards between the gill guides 2, 3 until the head is between the synchronously opened jaws of the head clamp 6, which closes shortly after the arrival of the conveyor 4. The fish is thus held in the desired position by the head clamp 6 and, while the conveyor 4 is at a standstill, is decapitated lying accurately positioned in the path of the circular decapitating knives 7. The knives 7 are moved downwardly in order to cut off the head of the fish by a device shown diagrammatically in the drawing. During the following period of movement the fish lying on the V-shaped entrainment elements 8 is carried up to the feeding point 9. In the next following period of movement, the head is first moved downwards out of the path of the fish and the fish, carried by the stylus or prong 10 appearing above the removed head, is fed between the toothed rollers 11 to the parallel belts 13 over the entrainment belt 12 engaging the belly of the fish.

The apparatus above described represents one possible embodiment for carrying out the method. The invention is, however, not confined to this form of construction.

What I claim is:

1. In an apparatus for decapitating and feeding fish into dressing machines, in combination, two gill guides for guiding fish, a conveyor, a head clamp carried by said conveyor, a plurality of V-shaped entrainment elements carried by said conveyor for holding the body of the fish in a belly-back position, two circular angularly extending, vertically movable decapitating knives for removing the head of the fish, a fish supporting prong located behind said decapitating knives, said conveyor being movable from said gill guides to said decapitating knives and thence to said prong, rollers located on opposite sides of said prong for moving the fish body carried by said prong, an entrainment belt located behind said prong for engaging the belly of the fish body, and two spaced parallel belts located above said entrainment belt for engaging the sides of the fish body supported by said entrainment belt.

2. In an apparatus for decapitating and feeding fish into dressing machines, a conveyor, a head clamp carried by said conveyor, a plurality of V-shaped entrainment elements carried by said conveyor for holding the body of the fish in a belly-back position, two circular angularly extending vertically movable decapitating knives for removing the head of the fish, and conveying means located behind said decapitating knives for receiving the body of the decapitated fish and conveying it to a dressing machine.

References Cited by the Examiner

UNITED STATES PATENTS

| | | | |
|---|---|---|---|
| 712,579 | 11/1902 | Nicholson et al. | 17—24 X |
| 1,326,905 | 1/1920 | Birch | 17—3 |
| 1,653,906 | 12/1927 | Heinbockel et al. | 17—3 |
| 1,920,339 | 8/1933 | Baader | 17—4 |
| 2,625,705 | 1/1953 | Avetta et al. | 17—2 |

LUCIE H. LAUDENSLAGER, *Primary Examiner.*

SAMUEL KOREN, *Examiner.*